US007439709B2

(12) United States Patent
Bumiller

(10) Patent No.: US 7,439,709 B2
(45) Date of Patent: Oct. 21, 2008

(54) CHARGER UNIT FOR AN ELECTRONIC DEVICE INCLUDING A SYSTEM FOR PROTECTIVE STORAGE OF AN ADAPTER PLUG

(75) Inventor: George Baldwin Bumiller, Ramsey, NJ (US)

(73) Assignee: Research In Motion Limited, Waterloo, Onatrio (CA)

( * ) Notice: Subject to any disclaimer, the term of this patent is extended or adjusted under 35 U.S.C. 154(b) by 0 days.

(21) Appl. No.: 11/739,860

(22) Filed: Apr. 25, 2007

(65) Prior Publication Data

US 2007/0285050 A1 Dec. 13, 2007

Related U.S. Application Data

(63) Continuation of application No. 11/071,786, filed on Mar. 3, 2005, now Pat. No. 7,265,517.

(51) Int. Cl.

| | |
|---|---|
| ***H02J 7/02*** | (2006.01) |
| ***H02J 7/00*** | (2006.01) |
| ***H01R 13/44*** | (2006.01) |
| ***H01R 29/00*** | (2006.01) |
| ***H01R 13/60*** | (2006.01) |

(52) U.S. Cl. ....................... 320/114; 320/111; 439/131; 439/166; 439/170; 439/171; 439/173; 439/174; 439/175; 439/528; 439/529; 439/148

(58) Field of Classification Search ................. 320/111, 320/114; 439/131, 166, 148, 170–175, 528, 439/529; 206/701, 702, 720, 372, 377–379, 206/717; 362/183
See application file for complete search history.

(56) References Cited

U.S. PATENT DOCUMENTS

| | | | | |
|---|---|---|---|---|
| 2,092,527 | A * | 9/1937 | Chirelstein | 439/652 |
| 4,622,507 | A * | 11/1986 | Persen | 320/111 |
| 4,973,827 | A | 11/1990 | Nozaki | |
| 2002/0016088 | A1 * | 2/2002 | Mendelson et al. | 439/39 |
| 2003/0142817 | A1 | 7/2003 | Liao | |

FOREIGN PATENT DOCUMENTS

| | | | |
|---|---|---|---|
| EP | 1372254 | A2 | 12/2003 |
| GB | 1518723 | | 7/1978 |

* cited by examiner

*Primary Examiner*—Bao Q. Vu
*Assistant Examiner*—Jue Zhang
(74) *Attorney, Agent, or Firm*—Philip E. Levy; Brij K. Agarwal; Eckert Seamans Cherin & Mellott, LLC

(57) ABSTRACT

A charger unit for an electronic device that includes a housing, a plurality of charging contacts provided on the housing, and a recess provided in the housing, preferably on a rear face thereof. A plug having a plurality of prongs may be selectively attached to and detached from the housing for electrically connecting the charger unit to a source of charging current. When attached to the housing, one or more of the prongs of the plug are electrically connected to a respective one of the charging contacts. In addition, a plurality of storage sockets are provided in the housing within the recess. Each of the storage sockets are adapted to receive and hold therein a respective one of the prongs of the plug to enable the plug to be safely and securely stored when not in use.

13 Claims, 7 Drawing Sheets

CHARGER UNIT FOR AN ELECTRONIC DEVICE INCLUDING A SYSTEM FOR PROTECTIVE STORAGE OF AN ADAPTER PLUG

CROSS-REFERENCE TO RELATED APPLICATION

This application is a continuation of U.S. patent application Ser. No. 11/071,786, entitled "Charger Unit For An Electronic Device Including A System For Protective Storage Of An Adapter Plug," filed on Mar. 3, 2005 now U.S. Pat. No. 7,265,517.

BACKGROUND OF THE INVENTION

1. Field of the Invention

The invention relates generally to portable electronic devices such as a handheld electronic device, and, more particularly, to a charger unit for charging the battery of and/or providing power to the electronic device that includes a system for protective storage of an adapter plug used in connection with the charger unit.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications. Many handheld electronic devices also feature wireless communication capability, although many such handheld electronic devices are stand-alone devices that are functional without communication with other devices.

Such handheld electronic devices are generally intended to be portable and thus are relatively small. In addition, most portable handheld electronic devices are powered by a rechargeable battery, such as a rechargeable lithium battery. As is known, such rechargeable batteries may be recharged using a charger unit having a plug (male electrical connector) that is inserted into an AC electrical outlet such as those available in a home or office. Specifically, in a typical recharging situation, the handheld electronic device having the reachable battery connected thereto is electrically connected, such as by a wire connection or by mated integral electrical contacts, to the charger unit, and current drawn from the AC electrical outlet by the charger unit is used to produce a chemical reaction inside the rechargeable battery, thereby recharging it. In addition, many such charger units may be used to provide power to handheld electronic devices directly (while being used) without use of the rechargeable battery.

One common problem with known charger units is that they may be easily damaged. In particular, the metal prongs of many charger unit plugs are susceptible to damage, such as the bending or breaking thereof, especially when the user is traveling.

In addition, as is known, electrical systems differ around the world, utilizing differing voltage levels and differing connection mechanisms (e.g. different plug configurations). In order to enable a user to recharge a battery using any one of a number of such different electrical systems, such as when the user travels to a different country, some current charger units are provided with removable and replaceable adapter plugs, each one being suitable for use in connection with a different electrical system. The adapter plugs not in use must be separately stored by the user, and are often susceptible to damage and being misplaced.

FIGS. 1 and 2 are front and isometric views, respectively, of one known charger unit 5 for charging the battery of a handheld electronic device. Charger unit 5 utilizes removable and replaceable adapter plugs, such as plug 10 shown in FIGS. 2, 3 and 4, to enable it to be used in different countries in connection with different electrical systems. Plug 10, for example, is a plug suitable for use in connection with the standard 110 volt electrical system utilized in North America. Plug 10 includes metal prongs 15A and 15B connected to and protruding from the front side 20 of base 25. Base 25 is typically made of plastic and includes tongues 30A and 30B extending from opposite sides thereof. In addition, lip portion 35 is located at the bottom end of the back side 40 of base 25. As seen in FIG. 4, contacts 45A and 45B are included within base 25 and are in electrical contact with prongs 15A and 15 B, respectively.

Referring again to FIGS. 1 and 2, charger unit 5 includes a housing 50 in which the electrical circuitry of charger unit 5 is provided. Front face 55 of housing 50 is provided with a recess 60 having grooves 65A and 65B located on opposite sides thereof. A latch 70 is provided adjacent to the bottom end of recess 60. Contacts 75A and 75B are provided within recess 60, and are connected to the electrical circuitry housed within housing 50. Plug 10, and other plugs suitable for use in other electrical systems, may be selectively attached to housing 50 by sliding tongue 30A within groove 65A and tongue 30B within groove 65B. When the bottom of plug 10 approaches the bottom of recess 60, latch 70 engages lip portion 35 to hold plug 10 in place. In this state, which is shown in FIG. 5, contact 45A engages contact 75A and contact 45B engages contact 75B. Latch 70 may be actuated by button 80 provided on front face 55 of housing 50 in order to detach plug 10 therefrom.

As described above, the problem with a charger unit such as charger unit 5 is that prongs 15A and 15B are left unprotected and thus are susceptible to being bent or broken, both when plug 10 is attached to and detached from charger unit 5. Further, when the prongs are left unprotected, they could poke through the side of a computer case, briefcase or writing folio. In addition, when plug 10 is detached from charger unit 5, it is susceptible to being lost. One known prior art charger system has attempted to address these problems by including a rotatable plug portion (having NA-type prongs for insertion into an outlet) that may be rotated approximately 90 degrees into a protective position within the housing of the charger unit in which the prongs no longer extend outwardly from the housing. While this system does provide protection to the prongs of the NA plug used for charging, it still requires multiple different types of plugs to be swapped in and out for other type electrical sockets as desired. In another prior art charger system that protects an NA plug, the NA plug is permanently attached and rotates 90 degrees in the plane of the centerlines of the prongs. Both of these prior art charger systems can be used with generic adapter plugs that may slide over the prongs in the stowed position; however, these generic plugs are usually quite large and bulky, since they may be used for much heavier electrical power loads than necessary for the AC adapters for mobile electronic devices. Thus, there is a need for a charger unit for an electronic device such as a handheld electronic device that can accommodate and utilize multiple different types of plugs as selected by the user and provide protection to such plugs when not in use.

SUMMARY OF THE INVENTION

These and other aspects and advantages are provided by a charger unit for an electronic device that includes a housing, a plurality of charging contacts provided on the housing, and a recess provided in the housing. A plug having a plurality of prongs may be selectively attached to and detached from the housing. When attached to the housing, one or more of the prongs of the plug are electrically connected to a respective one of the charging contacts. In addition, a plurality of storage sockets are provided in the housing within the recess. Each of the storage sockets are adapted to receive and hold therein a respective one of the prongs of the plug to enable the plug to be safely and securely stored when not in use. In the preferred embodiment, the recess is provided on a rear face of the housing that is opposite the face of the housing to which the plug may be connected for charging purposes.

The plug utilized by the charger unit has a base to which the prongs are attached. Preferably, the recess has a depth that is greater than or equal to the height of the base such that substantially none of the base will extend beyond the outer surface of the housing when the prongs of the plug are inserted into the storage sockets. In addition, in some plugs, the midpoint of each of the prongs is located a first distance from the first end of the base and a second distance from the second end of the base such that the plug is not symmetrical. In particular, the first distance is greater than the second distance. One embodiment of the invention is adapted to accommodate such an asymmetry by locating the midpoint of each of the storage sockets a third distance from the first end of the recess and a fourth distance from a second end of the recess, with the third distance and the fourth distance both being greater than the first distance.

Each of the storage sockets may have a securing mechanism used to secure the prongs in place when they are inserted within the storage socket. The securing mechanism may include a spring element that engages a hole provided on the corresponding prong. Under normal operating conditions, the plug will be held securely in place by the spring element and a user must exert a force sufficient to overcome the spring force to remove the plug from the recess.

In another particular embodiment, the recess includes first and second secondary recesses, with a plateau surface being provided therebetween. The bottom surface of each of the secondary recesses is disposed below the plateau surface. The storage sockets are provided within the housing at the plateau surface. With this configuration, the secondary recesses provide extra space for the insertion of a users fingers to facilitate the removal of the plug from the recess.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
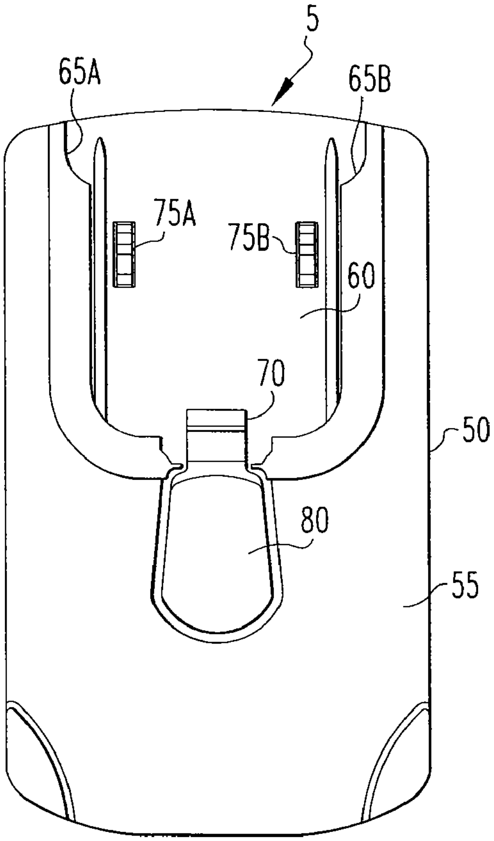
FIG. 1 PRIOR ART
FIGS. 1 and 2 are front and isometric views, respectively, of a prior art charger unit.
Figure 4:
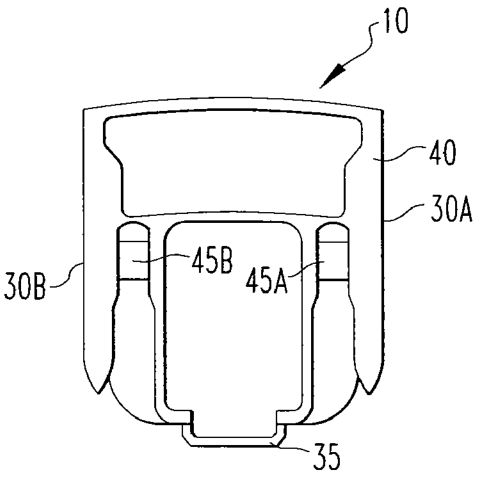
FIG. 4 PRIOR ART
FIGS. 3 and 4 are side and front elevational views, respectively, of a prior art adapter plug.
Figure 2:
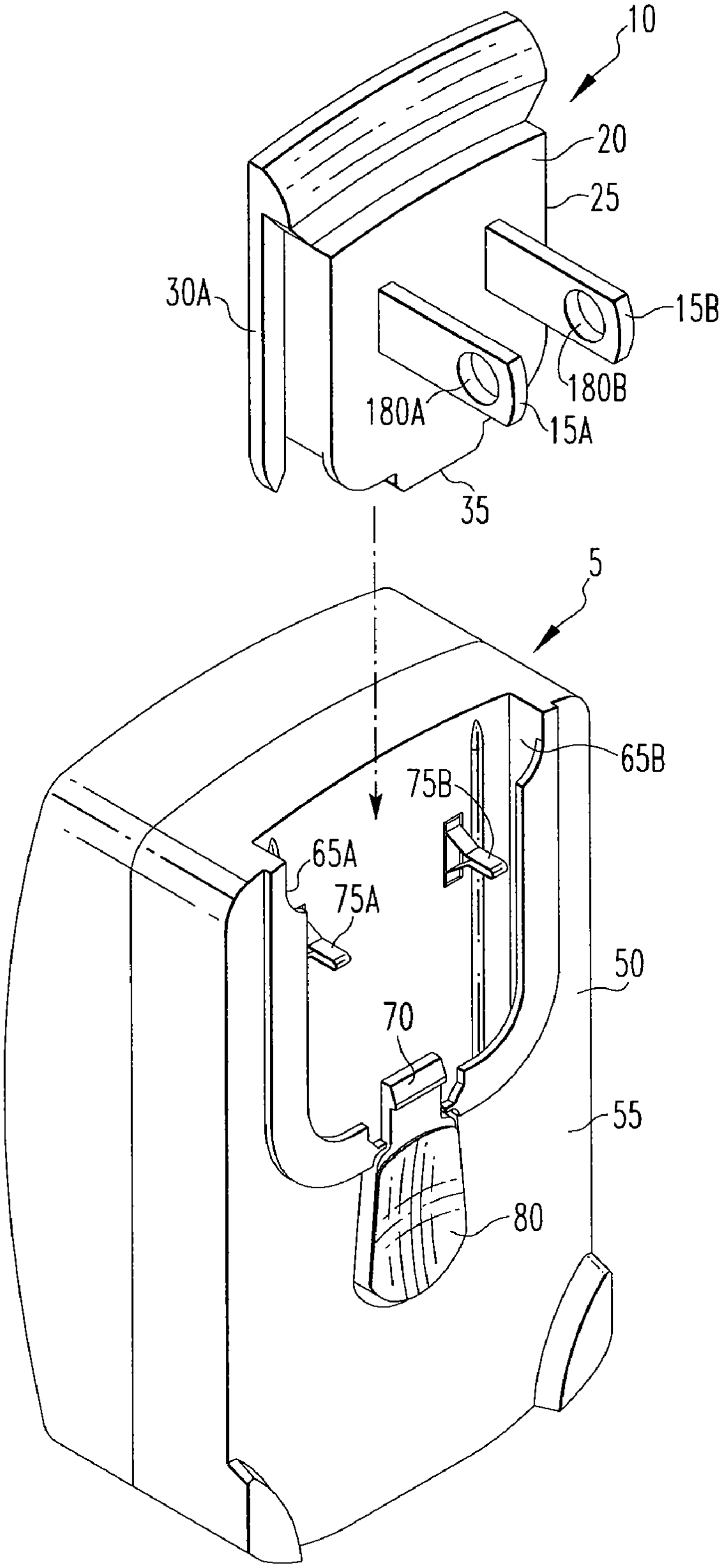
FIG.2 PRIOR ART
Figure 5:
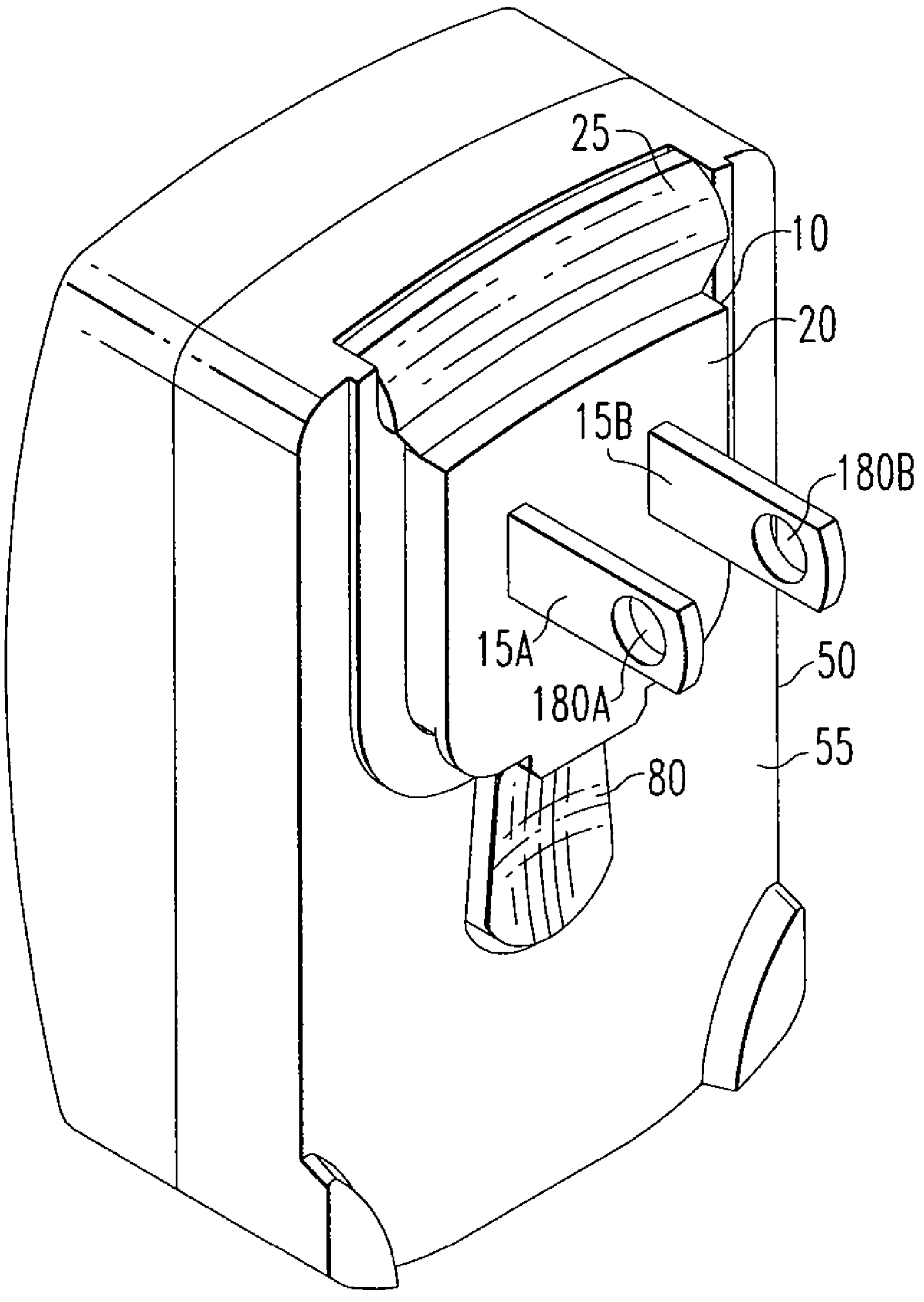
FIG. 5 PRIOR ART
FIG. 5 is a perspective view of the charger unit shown in FIGS. 1 and 2 having the plug shown in FIGS. 3 and 4 attached thereto.
Figure 6:
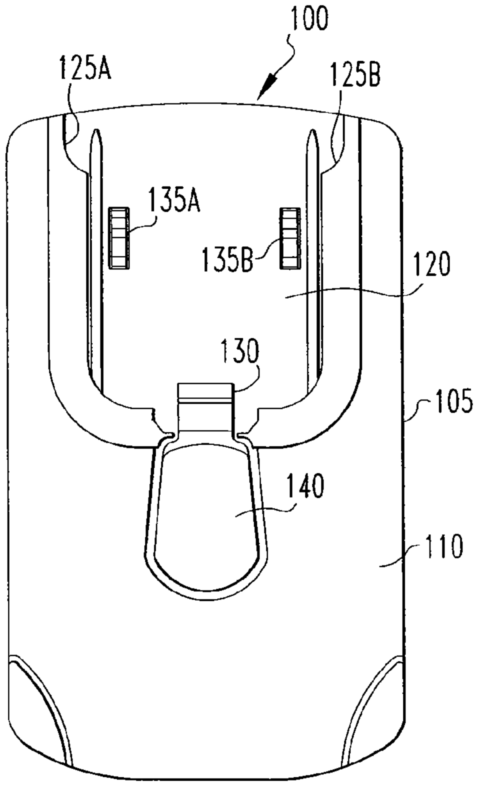
FIGS. 6, 7 and 8 are front elevational, rear elevational and isometric views, respectively, of a charger unit according to the present invention.
Figure 7:
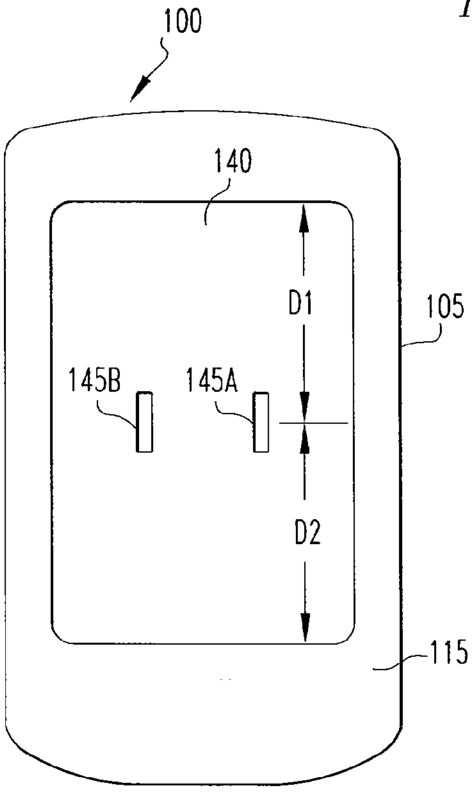
Figure 8:
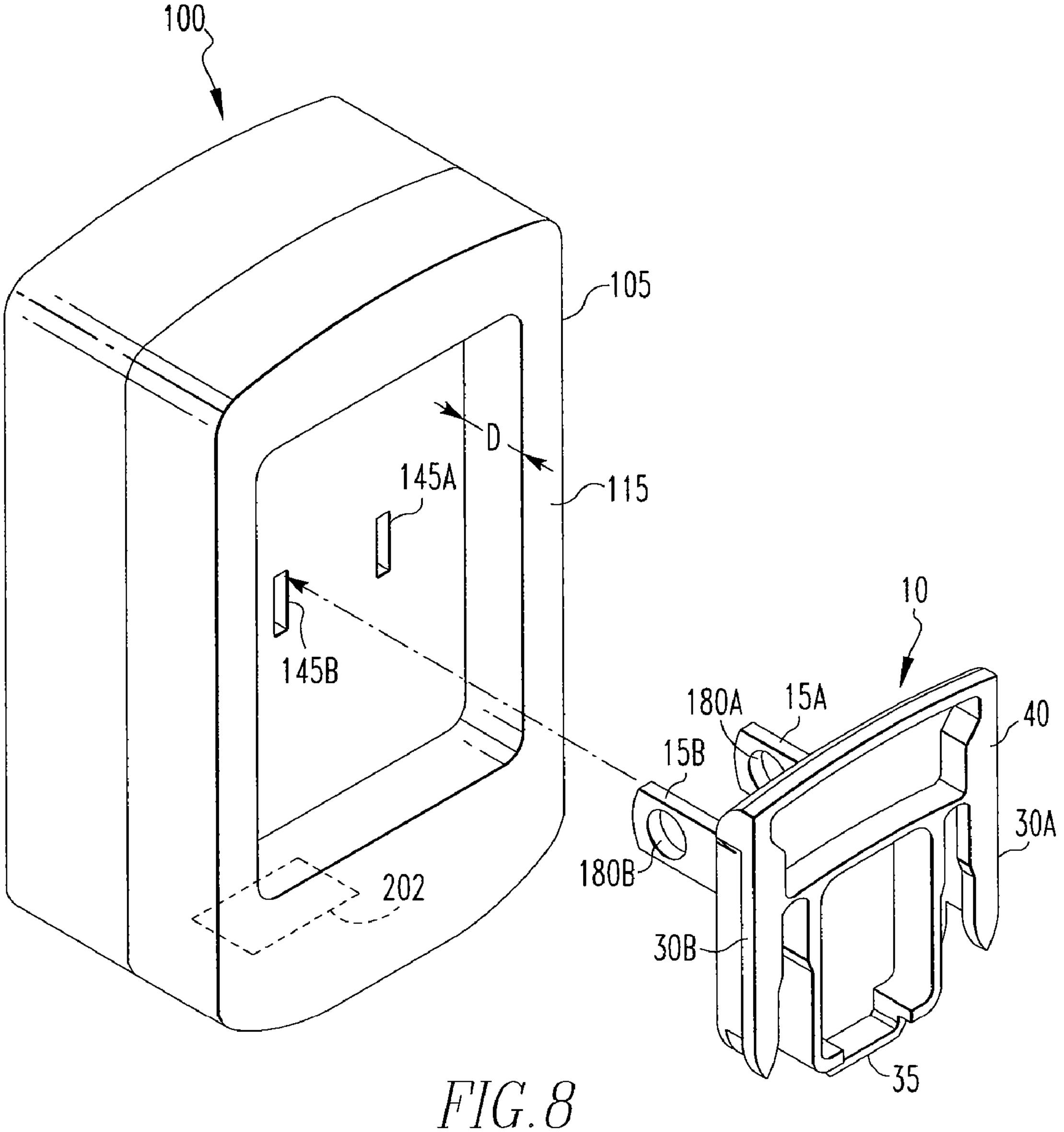

FIG. 6 is a front elevational view, FIG. 7 is a rear elevational view, and FIG. 8 is an isometric view of a charger unit 100 for charging the battery of an electronic device, such as a handheld electronic device, according to the present invention. Charger unit 100 utilizes removable and replaceable adapter plugs, such as the prior art plug 10 shown in FIGS. 3 and 4 and described above, to enable it to be used in different countries in connection with different electrical systems. Charger unit 100 includes a housing 105 in which the electrical circuitry and other components of charger unit 100 are provided. Charger unit 100 includes port 102 for receiving a wire, the other end of which is connected to the electronic device being charged. Alternatively, a permanent wire (not shown) may be attached to housing 105. Housing 105 has a front face 110 and a rear face 115. Plugs such as plug 10 may be selectively attached to and detached from housing 105 on front face 110 for purposes of electrically connecting charger unit 100 to a jack such as an electrical outlet. Thus, front face 110, in the embodiment of charger unit shown in FIGS. 6, 7, and 8, includes a recess 120 having grooves 125A and 125B, a latch 130, contacts 135A and 135B, and a button 140 that are similar in structure and function to recess 60 having grooves 65A and 65B, latch 70, contacts 75A and 75B and button 80, respectively, as described above in connection with prior art charger unit 5 (see FIGS. 1, 2 and 5). These components enable plug 10 and other structurally similar plugs (e.g., those having different prong configurations suitable for different electrical systems) to be selectively attached to (and electrically connected to) charger unit 100.

Figure 3:
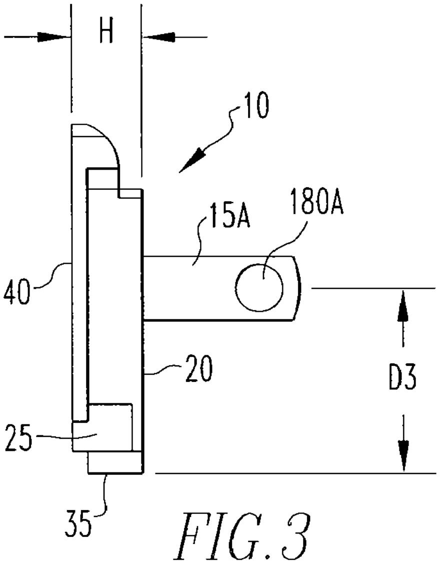
FIG. 3 PRIOR ART
Figure 9:
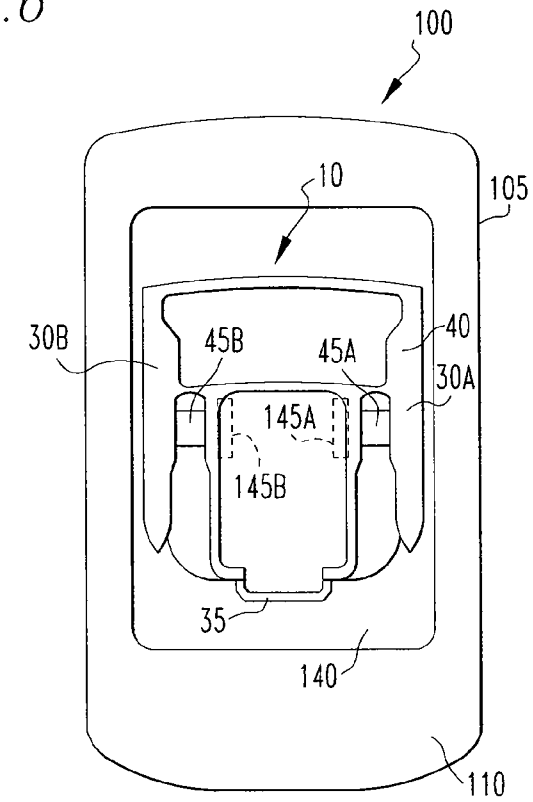
FIGS. 9 and 10 are rear elevational and isometric views, respectively, of the charger unit shown in FIGS. 6, 7 and 8 having a plug as shown in FIGS. 3 and 4 inserted into a recess provided therein.
Figure 10:
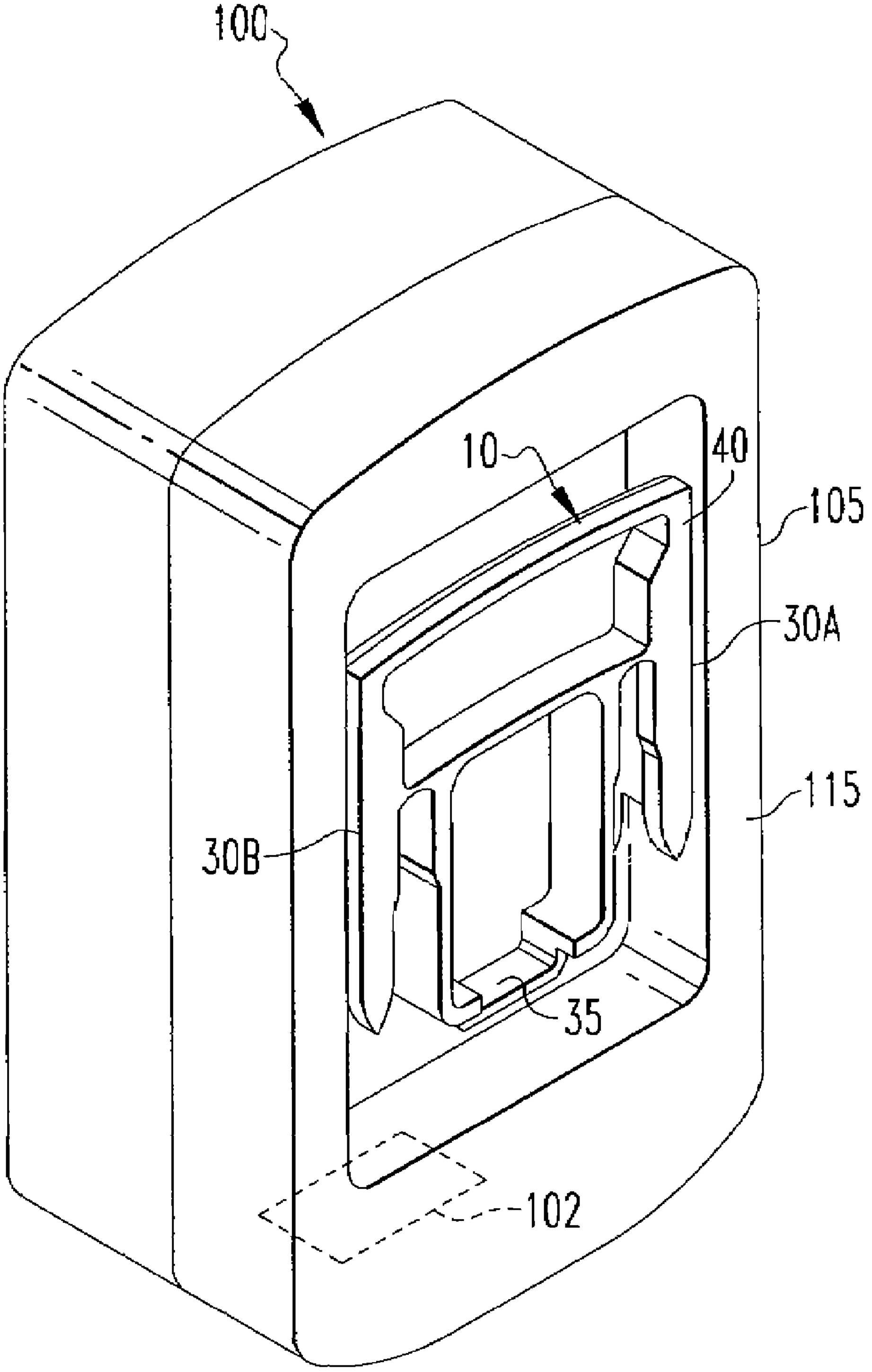

As seen in FIGS. 7 and 8, rear face 115 of housing 105 has a recess 140 provided therein. In the embodiment shown, recess 140 has a generally rectangular shape, although other shapes are possible. Recess 140 includes sockets 145A and 145B, which may comprise plastic sleeves or the like provided within housing 105. Recess 140 is adapted to function as a protective storage area for plug 10 when plug 10 is not in use. In particular, socket 145A is adapted to receive therein prong 15A of plug 10 and socket 145B is adapted to receive therein prong 15B of plug 10 such that plug 10 rests within recess 140. Charger unit 100 having a plug 10 inserted into and held by recess 140 is shown in FIG. 9, which is a rear elevational view, and FIG. 10, which is a rear isometric view. Preferably, recess 140 has a depth D as shown in FIG. 8 that is at least as large as the height H, shown in FIG. 3, of base 25 of plug 10 so that when plug 10 is inserted into and held by recess 140, no part of base 25 of plug 10 will protrude over the top edge 150 of recess 140. In addition, distances D1 and D2 measured from the center of sockets 145A and 145B to the first and second end, respectively, of recess 140 are sufficiently large enough to enable a user to hold base 25 of plug 10 with two or more fingers and insert prongs 15A and 15B into sockets 145A and 145B, and to subsequently remove plug 10 from recess 140 when desired. Furthermore, as seen in FIG. 3, many plugs such as plug 10 are not symmetrical, meaning that prongs 15A and 15B are not positioned in the middle of base 25, but instead are slightly offset toward the top of base 25 (away form lip portion 35). In order to accommodate such an asymmetry, each distance D1 and D2 is made large enough to allow the insertion of plug 10 with the top side of base 25 either up or down. Specifically, each of the distances D1 and D2 must be greater than a distance D3 (plus some manufacturing tolerance), wherein, as seen in FIG. 3, the distance D3 is the distance from the middle of prongs 15A and 15B to the bottom of base 25. As will be appreciated, if the distances D1 and D2 are not made sufficiently large, base 25 will not be able to be fit within recess 140 in one of the two insertion positions.

As an alternative, more than one recess 140 may be provided on rear face 115 of housing 105, each one being configured to hold a different type of plug. In addition, recess 140 may be provided in a location other than rear face 115, such on the same face (front face 110) to which the plug 10 may be attached for charging purposes.

Figure 12:
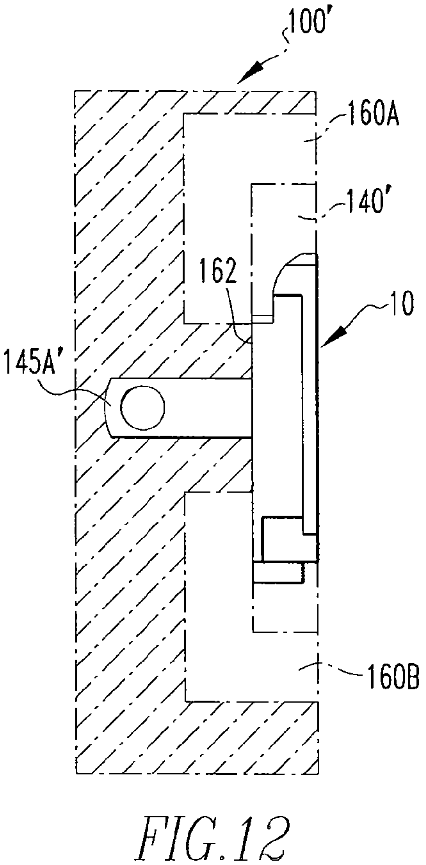
FIGS. 11 and 12 are front elevational and side schematic views, respectively, of an alternate embodiment of a charger unit according to the present invention.
Figure 11:
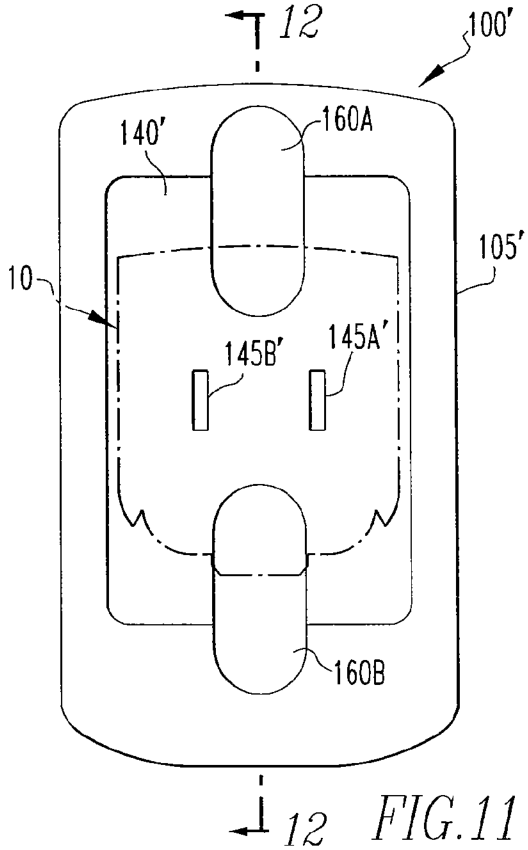

FIGS. 11 and 12 show charger unit 100' according to an alternative embodiment of the present invention. Charger unit 100' is identical to charger unit 100 except that recess 140' includes secondary recesses 160A and 160B. A plateau surface 162 is provided between the secondary recesses 160A and 160B, and includes sockets 145A' and 145B'. As seen in FIG. 12, recesses 160A and 160B provide a space in which a user may insert part of a finger in order to more easily remove plug 10 from recess 140'.

Figure 13:
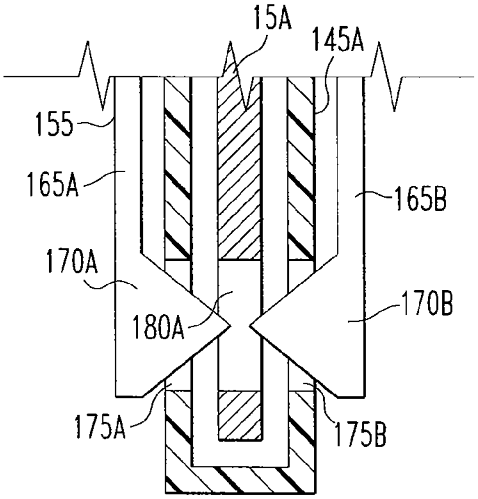
FIG. 13 is a schematic of a spring element according to an aspect of the present invention.

In addition, according to one aspect of the present invention, a mechanism is provided for securing plug 10 in place when prongs 15A and 15B are inserted into sockets 145A and 145B. One embodiment of such a mechanism, shown in FIG. 13, utilizes a spring element 155 to secure plug 10 in place. Spring element 155 includes attaching portion (not shown) and spring fingers 165A and 165B, each having a spring pin 170A and 170B. The attaching portion is configured to wrap around the exterior of a socket 145A or 145B to secure spring element 155 thereto. When so secured, as seen in FIG. 13, spring pins 170A and 170B will be aligned with a respective hole 175A or 175B provided in the exterior of socket 145A or 145B. Spring fingers 165A and 165B, and in particular spring pins 170A and 170B, engage holes 180A and 180B provided in prongs 15A and 15B when prongs 15A and 15B are inserted into sockets 145A and 145B. The force of spring fingers 165A and 165B is sufficient to hold plug 10 in place within recess 140 under normal conditions. When it is desired to remove plug 10 from recess 140, a user must apply a pulling force sufficient to overcome the force of the spring fingers 165A and 165B. As will be appreciated, other known securing mechanisms, such as other spring configurations or one or more magnets provided in socket 145A or 145B, may be used instead of the mechanism shown in FIG. 13.

While specific embodiments of the invention have been described in detail, it will be appreciated by those skilled in the art that various modifications and alternatives to those details could be developed in light of the overall teachings of the disclosure. For example, although the embodiments described herein have been described as being used for charging a handheld electronic device, the present invention may be used for charger units intended to charge the battery of any electronic device, such, without limitation, a laptop computer. Accordingly, the particular arrangements disclosed are meant to be illustrative only and not limiting as to the scope of the invention which is to be given the full breadth of the claims appended and any and all equivalents thereof.

What is claimed is:

1. A charger unit for an electronic device, said charger unit comprising:

a housing;

a plurality of charging contacts provided on said housing, wherein a plug having a plurality of prongs may be selectively attached to and detached from said housing, one or more of said prongs being electrically connected to a respective one of said charging contacts when said plug is attached to said housing;

a recess provided in said housing; and a plurality of storage sockets provided in said housing within said recess, each of said storage sockets being adapted to receive and hold therein a respective one of said prongs of said plug;

wherein said plug has a base, said prongs being attached to a first surface of said base, wherein a middle point of each of said prongs is located in a first plane that is substantially perpendicular to said first surface of said base and located a first distance from a first end of said base and a second distance from a second end of said base opposite said first end, said first distance being measured in a first direction that is substantially perpendicular to said first plane and said second distance being measured in a second direction that is substantially perpendicular to said first plane and opposite said first direction, said first distance being greater than said second distance, wherein a middle point of each of said storage sockets is located in a second plane that is substantially perpendicular to a bottom surface of said recess and located a third distance from a first end of said recess and a fourth distance from a second end of said recess opposite said first end, said third distance being measured in said first direction and said fourth distance being measured in said second direction, and wherein said third distance and said fourth distance are each greater than said first distance.

2. The charger unit according to claim 1, wherein said base of said plug has a height and said recess has a depth, and wherein said depth is greater than or equal to said height.

3. The charger unit according to claim 1, wherein each one of said storage sockets has a securing mechanism for securing said respective one of said prongs of said plug in place within said each one of said storage sockets.

4. The charger unit according to claim 3, wherein said securing mechanism of said each one of said storage sockets comprises a spring element.

5. The charger unit according to claim 4, wherein said spring element of said each one of said storage sockets comprises a spring finger having a spring pin, said spring pin being received within a hole provided in the respective one of said prongs that is received within said each one of said storage sockets.

6. The charger unit according to claim 1, wherein said recess includes a first secondary recess and a second secondary recess, wherein said housing includes a plateau surface between said first and second secondary recesses, wherein a bottom surface of each of said first and second secondary recess is disposed below said plateau surface, and wherein said plurality of storage sockets are provided within said housing at said plateau surface.

7. The charger unit according to claim 3, wherein said securing mechanism of said each one of said storage sockets comprises one or more magnets.

8. A charger unit for an electronic device, said charger unit comprising:

a housing;

a plurality of charging contacts provided on said housing, wherein a plug having a base and a plurality of prongs extending form a first surface of said base may be selectively attached to and detached from said housing, one or more of said prongs being electrically connected to a respective one of said charging contacts when said plug is attached to said housing;

a recess provided in said housing; and a plurality of storage sockets provided in said housing within said recess, a length of each of said storage sockets extending in a first direction within said housing, each of said storage sockets being adapted to receive and hold therein a respective one of said prongs of said plug;

wherein said recess includes a first secondary recess and a second secondary recess, wherein said housing includes a plateau surface between said first and second secondary recesses for supporting said front face of said base when said prongs are received within said storage sockets, said plateau surface being substantially perpendicular to said first direction, wherein a bottom surface of each of said first and second secondary recess is disposed below said plateau surface in said first direction and below said front face of said base when said prongs are received within said storage sockets, and wherein said plurality of storage sockets are provided within said housing at said plateau surface.

9. The charger unit according to claim 8, wherein said base of said plug has a height and said recess has a depth, and wherein said depth is greater than or equal to said height.

10. The charger unit according to claim 8, wherein each one of said storage sockets has a securing mechanism for securing said respective one of said prongs of said plug in place within said each one of said storage sockets.

11. The charger unit according to claim 10, wherein said securing mechanism of said each one of said storage sockets comprises a spring element.

12. The charger unit according to claim 11, wherein said spring element of said each one of said storage sockets comprises a spring finger having a spring pin, said spring pin being received within a hole provided in the respective one of said prongs that is received within said each one of said storage sockets.

13. The charger unit according to claim 10, wherein said securing mechanism of said each one of said storage sockets comprises one or more magnets.

* * * * *